United States Patent
Kim

(10) Patent No.: US 7,116,625 B2
(45) Date of Patent: Oct. 3, 2006

(54) APPARATUS AND METHOD FOR DETECTING A POSITION OF A PICKUP

(75) Inventor: Seung-hoon Kim, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 517 days.

(21) Appl. No.: 10/602,630

(22) Filed: Jun. 25, 2003

(65) Prior Publication Data

US 2004/0052187 A1 Mar. 18, 2004

(30) Foreign Application Priority Data

Sep. 16, 2002 (KR) .................. 10-2002-0056226

(51) Int. Cl.
*G11B 7/00* (2006.01)
(52) U.S. Cl. .................. 369/59.25; 369/53.29
(58) Field of Classification Search .............. 369/59.25
See application file for complete search history.

(56) References Cited

U.S. PATENT DOCUMENTS

| 5,499,225 | A |   | 3/1996 | Yoshimura |
| 5,844,865 | A |   | 12/1998 | Bakx |
| 6,058,086 | A | * | 5/2000 | Yeo et al. ................. 369/53.21 |
| 6,741,534 | B1 |   | 5/2004 | Takahashi et al. |
| 7,012,861 | B1 |   | 3/2006 | Hong et al. |
| 2001/0009539 | A1 | * | 7/2001 | Ogasawara et al. ....... 369/59.25 |
| 2002/0150394 | A1 | * | 10/2002 | Osakabe ..................... 386/126 |
| 2004/0001397 | A1 | * | 1/2004 | Jeong et al. ............. 369/30.11 |
| 2004/0081430 | A1 | * | 4/2004 | Lee et al. ..................... 386/70 |

FOREIGN PATENT DOCUMENTS

| KR | 1020010062678 | 7/2001 |
| KR | 2001-76445 | 8/2001 |
| KR | 1020010098589 | 11/2001 |

OTHER PUBLICATIONS

Korean Office Action for Korean Patent Application No. 10-2002-0058076 dated Apr. 29, 2005, which corresponds to co-pending related U.S. Appl. No. 10/624,561.
U.S. Appl. No. 10/624,561, filed Jul. 23, 2003, Jong-hoon Lee et al., Samsung Electronics Co., Ltd.

* cited by examiner

*Primary Examiner*—Wayne Young
*Assistant Examiner*—Van T. Pham
(74) *Attorney, Agent, or Firm*—Staas & Halsey LLP

(57) ABSTRACT

An apparatus and method thereof detect a location of a pickup in an optical disc. A pickup reads and writes a signal from or to the optical disc. A spindle motor rotates the optical disc. A controller measures a rotational speed of the spindle motor to detect a current location of the pickup in the optical disc, wherein the pickup is determined to be located in an area of more than 90 minutes of the optical disc based on ATIP information recorded on the optical disc.

15 Claims, 4 Drawing Sheets

FIG. 4

| SPEED FACTOR | SPINDLE ROTATION SPEED (RPM) | | |
|---|---|---|---|
| | INNER AREA (25mm) | MIDDLE AREA (42.5mm) | OUTER AREA (59mm) |
| 2x | 917 | 539 | 388 |
| 4x | 1834 | 1079 | 777 |
| 8x | 3667 | 2157 | 1554 |
| 10x | 4584 | 2596 | 1942 |
| 12x | – | 3236 | 2331 |
| 16x | – | 4314 | 3108 |
| 20x | – | – | 3885 |
| 24x | – | – | 4661 |

APPARATUS AND METHOD FOR DETECTING A POSITION OF A PICKUP

CROSS-REFERENCE TO RELATED APPLICATIONS

This application claims the benefit of Korean Application No. 2002-56226, filed Sep. 16, 2002, in the Korean Intellectual Property Office, the disclosure of which is incorporated herein by reference.

BACKGROUND OF THE INVENTION

1. Field of the Invention

The present invention relates to an apparatus and method for reproducing an optical recording medium, and more particularly, to an apparatus and method for detecting a position of a pickup using information regarding a rotational speed of a disc at a wobble speed factor, which is a different type of recording speed factor when recording a signal on the disc that can store up to 90 minutes of data and holds repeating location information.

2. Description of the Related Art

In general, as shown in FIG. 1, a 90-minute optical disc includes three signal areas: a lead-in area, a program area, and a lead-out area. The lead-in area includes information recorded on the optical disc, such as information regarding a position, a type, and reproduction time thereof. The lead-in area is called a table of contents (TOC) area, and a TOC signal is repeatedly recorded in the lead-in area. A reproduction signal is recorded in the program area, and the lead-out area is a signal area that indicates a termination of a program. Referring to FIG. 1, except for a 99-minute disc, a 90–99 minute area is present only in the lead-in area. Thus, when a pickup is to be positioned in an area of 95 or more minutes, the area is regarded as being the lead-in area and access to the lead-in area begins.

However, in the case of an up-to-90 minute optical disc, the 90–99 minute area is present in both the lead-in area and the program area, as shown in FIG. 2. That is, in the optical disc having capacity of 90 minutes or more, location information, which is recorded in an absolute time-code in pre-groove (ATIP), is repeatedly recorded in the lead-in area and the program area. Therefore, there can be a case where a current location of the pickup cannot be precisely detected using only the location information decoded in the ATIP. When a signal is recorded on the optical disc, it is possible to easily reproduce the signal based on the location information recorded in a Sub-Q code. However, in the case of a recording device, the location information recorded in the ATIP is used to record the signal on the optical disc on which data or the signal is not recorded. Therefore, if the location information is read from outermost and innermost sections where the ATIP location information is repeatedly recorded, the same values are obtained, thereby making it difficult to detect a precise location of the pickup without additional information.

SUMMARY OF THE INVENTION

The present invention provides an apparatus to detect a location of a pickup using information regarding a rotational speed of a disc at a wobble speed factor, which is a different type of recording speed factor, when recording a signal on the disc, which can store up to 90 minutes of data and where location information is repeatedly recorded.

The present invention also provides a method of detecting a location of a pickup using information regarding a rotational speed of a disc at a wobble speed factor, which is a different type of recording speed factor, when recording a signal on the disc, which can store up to 90 minutes of data and where location information is repeatedly recorded.

According to an aspect of the present invention, there is provided an apparatus detecting the location of a pickup in an optical disc, the apparatus includes: a pickup reading and writing a signal from or to the optical disc; a spindle motor rotating the optical disc; and a controller measuring a rotational speed of the spindle motor to detect a current location of the pickup in the optical disc, wherein the pickup is determined to be located in an area of more than 90 minutes of the optical disc based on ATIP information recorded on the optical disc.

The apparatus further includes a motor controller delaying the measuring of the rotational speed of the spindle motor at the current location of the pickup until the rotational speed reaches a desired rotational speed, wherein a distance of a movement of the pickup exceeds a predetermined track number before the measurement of the rotational speed.

The controller includes a memory storing reference rotational speeds of the spindle motor for different areas of the optical disc; a comparator comparing the rotational speed of the spindle motor at the current location of the pickup with the reference rotational speeds and outputting a comparison result indicative thereof; and a location determination unit determining whether the pickup is present in a lead-in area when a current rotational speed is faster than the reference rotational speed at an inner area of the optical disc and determines whether the pickup is present in another area other than the lead-in area when the current rotational speed is slower than the reference rotational speed in an outer area based on the comparison result.

The location determination unit determines an error when the pickup is not present in the lead-in area, a program area, or a lead-out area.

According to another aspect of the present invention, there is provided a method of detecting a location of a pickup in an optical disc, wherein the optical disc is rotated using a spindle motor. The method includes measuring a rotational speed of the spindle motor at the current location of the pickup when the pickup is determined to be present in an area of more than 90 minutes of the optical disc from ATIP information; determining that the pickup is present in a lead-in area when the rotational speed of the spindle motor is faster than a reference rotational speed in an inner area of the optical disc; and determining that the pickup is present in an area other than the lead-in area when the rotational speed of the spindle motor is slower than the reference rotational speed at an outer area of the optical disc.

According to an aspect of the present invention, the method delays the measuring of the rotational speed of the spindle motor until the rotational speed reaches a desired rotational speed, wherein a distance of a movement of the pickup exceeds a predetermined track number before the measurement.

During the determining of the location of the pickup, when the pickup is determined not to be present in the lead-in area or in the area other than the lead-in area is treated as an error.

According to an aspect of the present invention, there is provided a method of an optical disc to detect a location of a pickup rotated using a spindle motor, including detecting a current position of the pickup using rotational speeds of the disc at a wobble speed factor when recording a signal on the disc, wherein the optical disc stores data more than 90 minutes and repeatedly records location information in different sections thereof.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a table illustrating rotational speeds of a spindle motor at inner, middle, and outer areas of the optical disc at a wobble constant linear velocity (CLV) speed factor, according to the location of the pickup.

DETAILED DESCRIPTION OF THE INVENTION

Figure 1:
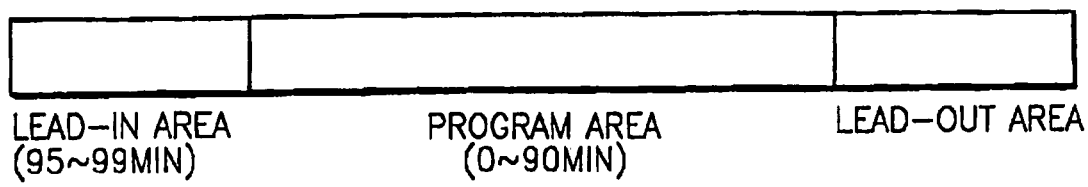
FIG. 1 is a diagram of signal areas of a 90-minute optical disc.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 2:
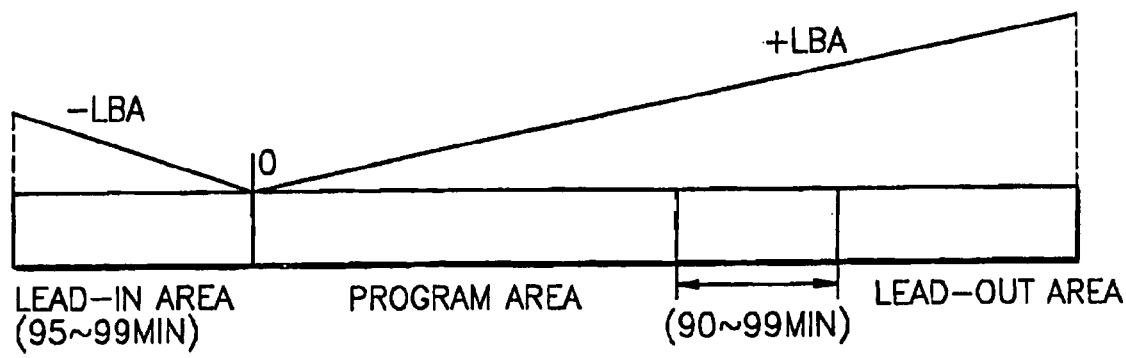
FIG. 2 is a diagram of signal areas of an optical disc longer than 90 minutes.

FIG. 2 is a diagram of signal areas of an optical disc longer than 90 minutes.

Figure 3:
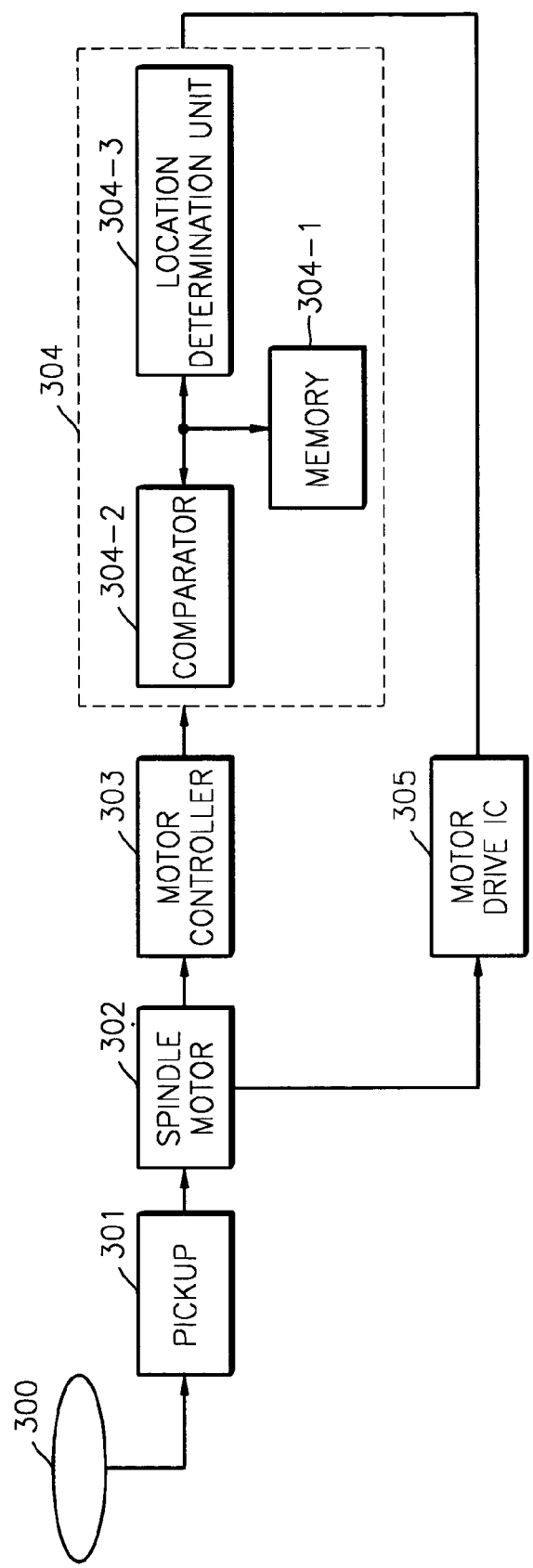
FIG. 3 is a block diagram illustrating a structure of an apparatus to detect a location of a pickup, according to an aspect of the present invention.

FIG. 3 is a block diagram illustrating a structure of an apparatus to detect a location of a pickup, according to an aspect of the present invention. Referring to FIG. 3, the apparatus includes an optical disc 300, a pickup 301, a spindle motor 302, a motor controller 303, a controller 304, and a motor drive integrated circuit (IC) 305. The controller 304 includes a memory 304-1, a comparator 304-2, and a location determination unit 304-3.

FIG. 4 is a table illustrating rotational speeds of the spindle motor 302 at inner, middle, and outer areas of the optical disc at a wobble constant linear velocity (CLV) speed factor, according to a location of the pickup 301.

Figure 5:
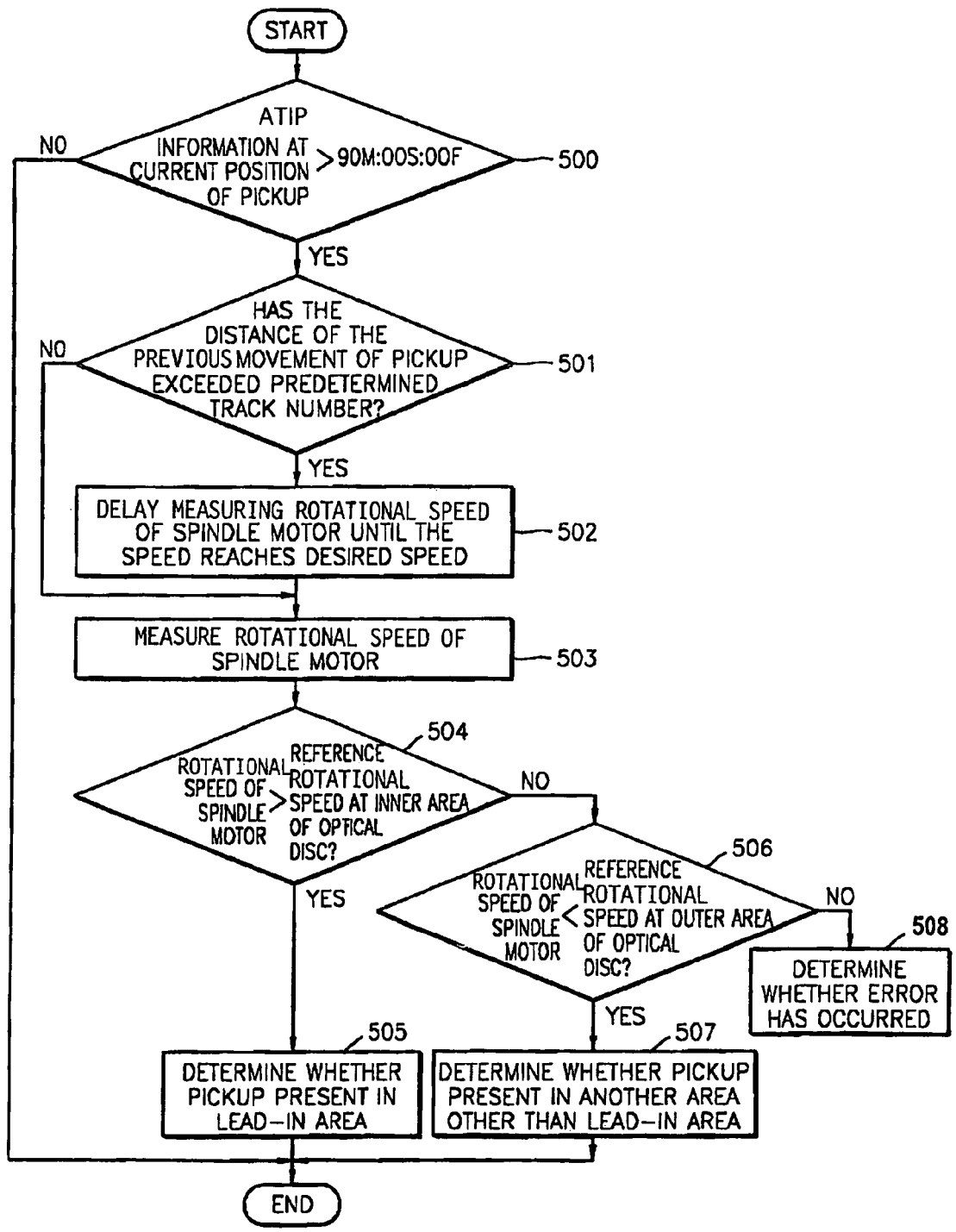
FIG. 5 is a flowchart illustrating a method of detecting the location of the pickup, according to an aspect of the present invention.

FIG. 5 is a flowchart illustrating a method of detecting a position of the pickup, according to an aspect of the present invention. The method of FIG. 5 includes, at operation 500, checking whether a total time in pre-groove (ATIP) information at a current position of the pickup 301 is more than 90 minutes. At operation 501, the method checks whether a distance of a movement of the pickup 301 exceeds a predetermined track number. At operation 502, the method delays a measurement of the rotational speed of the spindle motor 302 until the speed reaches a desired speed. At operation 503, the method measures the rotational speed of the spindle motor 302, at operation 504, checks whether the rotation speed is more than a reference inner area value and, at operation 505, checks whether the pickup 301 is currently positioned in a lead-in area. At operation 506, the method checks whether the rotational speed is less than a reference outer area value, and at operation 507, checks whether the pickup 301 is currently located in an area other than the lead-in area. At operation 508, the method checks whether errors occur.

Hereinafter, an apparatus and method to detect the position of the pickup 301, according to an aspect of the present invention, will be described with reference to FIGS. 2 through 5.

When the optical disc 300 is inserted into a recording device, the recording device reads the ATIP information, which is recorded on tracks of the optical disc 300 at intervals of time, using the pickup 301. The ATIP information contains information regarding the optical disc 300, e.g., a manufacturing company, a maximum recording speed, an optimum power, and an initial position of data.

As for an optical disc lasting up to 90 minutes, it is impossible to detect the current position of the pickup 301 by referring to only the location information, which is decoded in the ATIP, because the location information is repeatedly recorded in both a lead-in area and a program area, as shown in FIG. 2. Thus, whether the pickup 301 is located in the lead-in area or another area, i.e., the program area or a lead-out area, the position is checked based on the rotational speed of the spindle motor 302. The information used in detecting the current position of the pickup 301 is illustrated in FIG. 4. When the optical disc 300 is controlled to move at the predetermined CLV using a phase locked loop (PLL) circuit at a frequency that is decoded in the ATIP, it is possible to determine whether the pickup 301 is located in the lead-in area or another area, based on whether the rotational speed of the spindle motor 302 in the lead-in area is about double than that of the spindle motor 302 in the program area, as shown in FIG. 4.

If the ATIP information at the current position of the pickup 301 is 90 minutes or more, the controller 304 measures the rotational speed of the spindle motor 302. In this case, the motor controller 303 checks if the rotational speed of the spindle motor 302 at a present position of the pickup 301 is equivalent to a desired speed obtained when the spindle motor 302 moves at the CLV. When a distance of a previous movement of the pickup 301 exceeds a predetermined track number, the motor controller 303 delays the measurement of the rotational speed of the spindle motor 302 until the speed reaches the desired speed. If the pickup 301 moves to a further distance, much time is required for the rotational speed of the spindle motor 302 to reach the desired speed, because a difference between the rotational speeds of the spindle motor 302 at the previous and current positions is large. Therefore, the motor controller 303 monitors whether a speed error and a phase error can be maintained at minimum values for predetermined times, so as to determine a stability of the spindle motor 302.

When the spindle motor 302 is stabilized, the controller 304 measures the rotational speed of the spindle motor 302. The memory 304-1 stores the information, shown in FIG. 4, on which the detection of the current location of the pickup 301 can be based. For instance, the memory 304-1 may store reference rotational speeds of the spindle motor 302 in the lead-in area (inner area) 25 mm, the program area (middle area) 42.5 mm, and the lead-out area (outer area) 59 mm of the optical disc 300 according to a speed factor of the optical disc 300. The comparator 304-2 compares the rotational speed of the spindle motor 302 at the current location of the pickup 301 with the reference rotational speed stored in the memory 304-1 and outputs a comparison result. If the comparison result reveals that the current rotational speed of the spindle motor 302 exceeds the reference rotational speed at the inner area, the location determination unit 304-3 regards the pickup 301 as being positioned in the lead-in area. In contrast, if the comparison result reveals that the current rotational speed of the spindle motor 302 is lower than the reference rotational speed at the outer area, the pickup 301 is regarded as being positioned in the program area or the lead-out area, not in the lead-in area. However, when the pickup 301 seems to be currently located neither in the lead-in area nor in one of the other areas, the location determination unit 304-3 determines the result as an error.

According to an aspect of the present invention, when the optical disc 300 operates at a speed factor of 10× and the spindle motor 302 rotates at 4600 revolutions per minute (RPM), the location determination unit 304-3 determines that the pickup 301 is currently located in the lead-in area, as shown in FIG. 4. Referring to FIG. 4, if the speed factor of the optical disc 300 is 10×, the reference rotational speeds of the spindle motor 302 are 4584 RPM in the inner area, 2596 RPM in the middle area, and 1942 RPM in the outer area. The comparator 304-2 compares the current rotational speed of the spindle motor 302 with the reference rotational speeds 4584 RPM, 2596 RPM, and 1942 RPM. The present rotational speed 4600 RPM of the spindle motor 302 is larger than the reference rotational speed 4584 RPM in the inner area, and therefore, the location determination unit 304-3 determines that the pickup 301 is present in the lead-in area. In general, as a spindle motor moves toward the inner area from the outer area, the rotational speed of a spindle motor becomes faster.

A method of detecting the location of a pickup will now be described with reference to FIGS. 2 and 5. First, in operation 500, it is checked whether the ATIP information is more than 90 minutes at the present location of the pickup 301 so as to determine whether the optical disc 300 can store 90 minutes of data or more than 90 minutes of data.

If the ATIP information at the present location of the pickup 301 is more than 90 minutes, at operation 501, it is checked whether the distance of the movement of the pickup 301 exceeds a predetermined track number.

When the distance of the movement of the pickup 301 is beyond the predetermined track number, at operation 502, the rotational speed of the spindle motor 302 delays measuring the rotational speed of the spindle motor 302 until the rotational speed reaches a desired speed. A reason for delaying the measurement of the rotational speed is that the difference between the rotational speeds of the spindle motor 302 at previous and current locations is large when the pickup 301 moves to a further distance, and, thus, much time is required until the rotational speed becomes equivalent to the desired speed.

When the rotational speed of the spindle motor 302 is the same as the desired speed, at operation 503, the rotational speed of the spindle motor 302 is measured.

After operation 503, at operation 504, the rotational speed of the spindle motor 302 at the current location of the pickup 301 is compared with the reference rotational speed at the inner area, stored in the memory 304-1. At operation 505, the pickup 301 is regarded as being positioned in the lead-in area when the rotational speed is faster than the reference rotational speed in the inner area.

If it is determined at operation 504 that the rotational speed of the spindle motor 302 at the current location of the pickup 301 is not faster than the reference rotational speed in the inner area, it is checked whether the rotational speed of the spindle motor 302 at the current location of the pickup 301 is slower than the reference speed at the outer area. If the rotational speed of the spindle motor 302 at the current location of the pickup 301 is slower than the reference rotational speed at the outer area, the pickup 301 is regarded as being positioned in the program area or the lead-out area, not the lead-in area.

If the rotational speed of the spindle motor 302 is slower than the reference rotational speed at the outer area, i.e., the pickup 301 is considered as being present in an area other than the lead-in area, the program area, and the lead-out area, and, at operation 508, the location determination unit 304-3 determines the result as the error.

As described above, according to an aspect of the present invention, a current position of a pickup is detected using rotational speeds of a disc at a wobble speed factor, which is a recording speed factor, when recording a signal on the disc that can store data more than 90 minutes and when location information is repeatedly recorded in different sections. Accordingly, it is possible to easily detect the position of the pickup in the disc which is 90 minutes long without additional hardware, thereby increasing a performance of the disc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to detect a location of a pickup in an optical disc, comprising:
   a pickup reading or writing a signal from or to the optical disc;
   a spindle motor rotating the optical disc; and
   a controller determining whether the pickup is located in area of more than 90 minutes of the optical disc, and measuring a rotational speed of the spindle motor to detect a current location of the pickup in the optical disc, wherein the pickup is determined to be located in area of more than 90 minutes of the optical disc based on an absolute time-code in pre-groove (ATIP) information recorded on the optical disc, read by the pickup, and provided to the controller.

2. The apparatus of claim 1, further comprising:
   a motor controller delaying the measuring of the rotational speed of the spindle motor at the current location of the pickup until the rotational speed reaches a desired rotational speed, wherein a distance of a movement of the pickup exceeds a predetermined track number before the measurement of the rotational speed.

3. The apparatus of claim 1, wherein the controller comprises:
   a memory storing reference rotational speeds of the spindle motor for different areas of the optical disc;
   a comparator comparing the rotational speed of the spindle motor at the current location of the pickup with the reference rotational speeds and outputting a comparison result indicative thereof; and
   a location determination unit determining whether the pickup is present in a lead-in area when a current rotational speed is faster than the reference rotational speed at an inner area of the optical disc and determines whether the pickup is present in another area other than the lead-in area when the current rotational speed is slower than the reference rotational speed in an outer area based on the comparison result.

4. The apparatus of claim 3, wherein the location determination unit determines an error when the pickup is not present in the lead-in area, a program area, or a lead-out area.

5. A method to detect a location of a pickup in an optical disc, wherein the optical disc is rotated using a spindle motor, the method comprising:
   determining whether the pickup is present in area of more than 90 minutes of the optical disc from an absolute time-code in pre-groove (ATIP) information recorded on the disc;
   measuring a rotational speed of the spindle motor at the current location of the pickup when the pickup is determined to be present in area of more than 90 minutes of the optical disc from ATIP information;
   determining that the pickup is present in a lead-in area when the rotational speed of the spindle motor is faster than a reference rotational speed in an inner area of the optical disc; and
   determining that the pickup is present in an area other than the lead-in area when the rotational speed of the spindle motor is slower than the reference rotational speed at an outer area of the optical disc.

6. The method of claim 5, further comprising:
   delaying the measuring of the rotational speed of the spindle motor until the rotational speed reaches a desired rotational speed, wherein a distance of a movement of the pickup exceeds a predetermined track number before the measurement.

7. The method of claim 5, wherein an error is detected when the pickup is determined not to be present in the lead-in area or in the area other than the lead-in area.

8. A method to detect a location of a pickup for an optical disc, which has a lead-in area, a program area, and a lead-out area and which is rotated using a spindle motor, the method comprising:
   recording a signal on the disc;
   detecting a current position of the pickup using rotational speeds of the disc at a wobble speed factor when recording the signal on the disc, wherein the optical disc stores data in area of more than 90 minutes; and
   repeatedly recording location information in different areas of the optical disc.

9. The method of claim 8, wherein the wobble speed factor is a recording speed factor.

10. The method of claim 8, further comprising:
    reading an absolute time-code in pre-groove (ATIP) information recorded on tracks of the optical disc at intervals of time using the pickup, wherein the ATIP information comprises a manufacturing company, a maximum recording speed, an optimum power, and, an initial position of data the optical disc; and
    checking the rotational speed of the spindle motor to determine whether the pickup is located in the lead-in area, the program area, or the lead-out area of the optical disc.

11. The method of claim 8, further comprising:
    determining whether the pickup is located in the lead-in area, the program area, or the lead-out area when the optical disc is controlled to move at a predetermined wobble constant linear velocity (CLV) speed factor and based on whether the rotational speed of the spindle motor in the lead-in area is about double that of the spindle motor in the program area.

12. The method of claim 11, further comprising:
    measuring the rotational speed of the spindle motor when an absolute time-code in pre-groove (ATIP) information at the current position of the pickup is 90 minutes or more; and
    checking if the rotational speed of the spindle motor at the current position of the pickup is equivalent to a desired speed obtained when the spindle motor moves at the CLV speed factor.

13. The method of claim 12, further comprising:
    delaying the measurement of the rotational speed of the spindle motor until the rotational speed reaches a desired speed and when a distance of a previous movement of the pickup exceeds a predetermined track number.

14. The method of claim 13, further comprising:
    monitoring whether a speed error and a phase error are maintained at minimum values for predetermined times to determine a stability of the spindle motor.

15. The method of claim 14, further comprising:
    storing reference rotational speed speeds of the spindle motor in the lead-in area, the program area, and the lead-out area of the optical disc according to a speed factor of the optical disc;
    comparing the rotational speed of the spindle motor at the current location of the pickup with the reference rotational speeds stored and outputting a comparison result;
    determining the pickup to be positioned in the lead-in area when the comparison result indicates that the current rotational speed of the spindle motor exceeds the reference rotational speed at the lead-in area;
    determining the pickup to be positioned in the program area or the lead-out area when the comparison result indicates that the current rotational speed of the spindle motor is lower than the reference rotational speed at the lead-out area of the pickup; and
    determining an error when the comparison result indicates that the pickup is not currently located in the lead-in area, the program area, or the lead-out area.

* * * * *

UNITED STATES PATENT AND TRADEMARK OFFICE
CERTIFICATE OF CORRECTION

PATENT NO. : 7,116,625 B2  Page 1 of 1
APPLICATION NO. : 10/602630
DATED : October 3, 2006
INVENTOR(S) : Seung-hoon Kim It is certified that error appears in the above-identified patent and that said Letters Patent is hereby corrected as shown below:

Col. 7, line 50, change "and," to --and--

Col. 8, line 33, after "speed", delete "speeds"

Signed and Sealed this

Twenty-seventh Day of March, 2007

JON W. DUDAS
*Director of the United States Patent and Trademark Office*